Oct. 7, 1952  R. W. HIBBARD  2,612,879
ROTARY INTERNAL-COMBUSTION ENGINE
Filed Sept. 26, 1950  3 Sheets-Sheet 1

INVENTOR
ROGER W. HIBBARD,
BY McMorrow, Berman & Davidson
ATTORNEYS

Oct. 7, 1952 R. W. HIBBARD 2,612,879
ROTARY INTERNAL-COMBUSTION ENGINE
Filed Sept. 26, 1950 3 Sheets-Sheet 3

INVENTOR
ROGER W. HIBBARD,

BY McMorrow, Berman + Davidson
ATTORNEYS.

Patented Oct. 7, 1952

2,612,879

UNITED STATES PATENT OFFICE 2,612,879

ROTARY INTERNAL-COMBUSTION ENGINE

Roger W. Hibbard, Quincy, Ill., assignor of thirty-five per cent to Elmo Tellbuescher, Quincy, Ill., and forty per cent to Everett Siegfried, Carthage, Ill.

Application September 26, 1950, Serial No. 186,800

5 Claims. (Cl. 123—16)

This invention relates to rotary internal combustion engines and more particularly to a fuel injection engine operating on a two cycle principle.

It is among the objects of the invention to provide an improved rotary internal combustion engine having no reciprocating pistons either for delivering power or compressing combustion air, which is regenerative in part, reusing a portion of the products of combustion to assist compression and to utilize unburned fuel in the combustion gas, which provides overlapping power strokes giving a smooth delivery of power and substantially vibrationless operation, which may be provided in banks of any desired numbers of power units, which is supercharged to increase its operational efficiency, and which is simple and durable in construction comprising a minimum number of simple parts, economical to manufacture, and positive and efficient in operation.

Other objects and advantages will become apparent from a consideration of the following description and the appended claims in conjunction with the accompanying drawings wherein:

Figure 1:
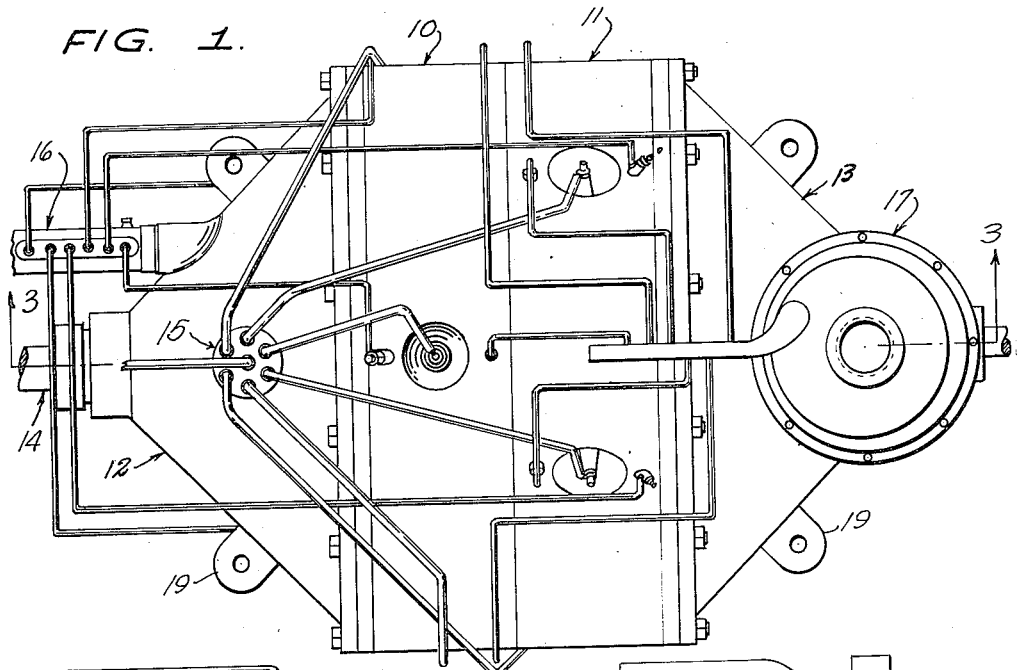
Figure 1 is a top plan view of a rotary internal combustion engine illustrative of the invention.
Figure 2:
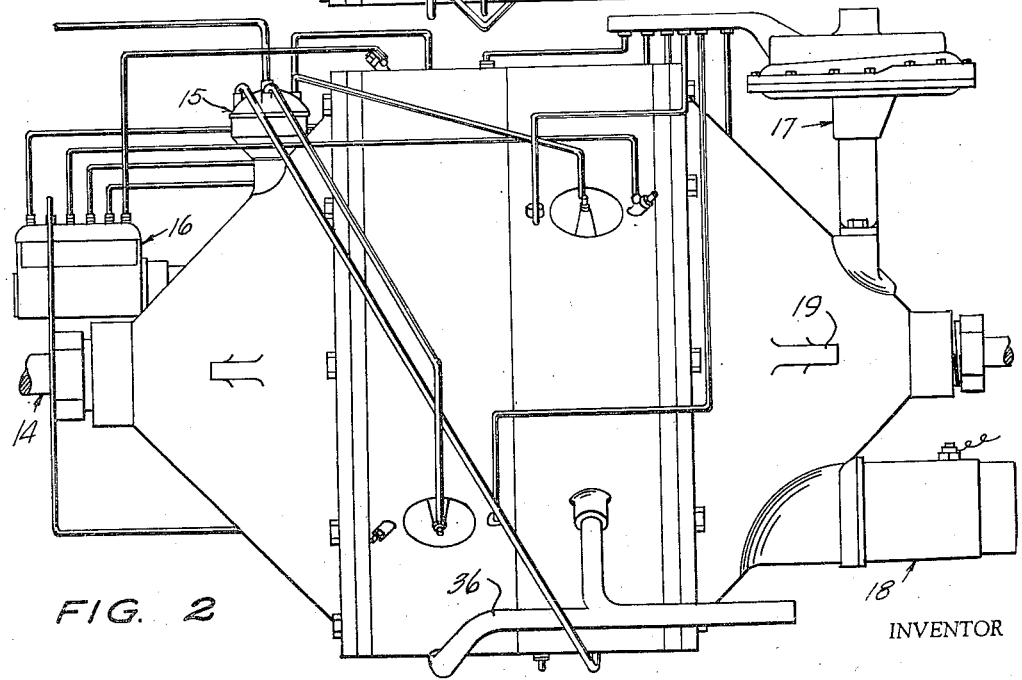
Figure 2 is a side elevational view of the engine illustrated in Figure 1.

With continued reference to the drawings, the engine illustrated in Figures 1 and 2 comprises, in general, two power units 10 and 11 secured together in side by side relationship, two conical end structures 12 and 13 secured to the respectively opposite ends of the power section comprising the units 10 and 11 and projecting outwardly from the power section, a power shaft 14 journaled in the end sections 12 and 13, an engine driven electric ignition system 15, an engine driven fuel injection system 16, an engine driven supercharger 17 and an electric engine starter 18. The end sections or structures 12 and 13 are provided with outwardly extending, apertured lugs or brackets 19 for supporting the engine on a suitable engine mount which may be either mobile or stationary.

While the engine has been illustrated as having two power units 10 and 11, it is to be understood that any number of power units may be used consistent with the desired amount of power to be developed by the engine, the strength of the power shaft 14, the complication of the ignition and fuel injection systems and other practical considerations.

Figures 4, 5, 6:
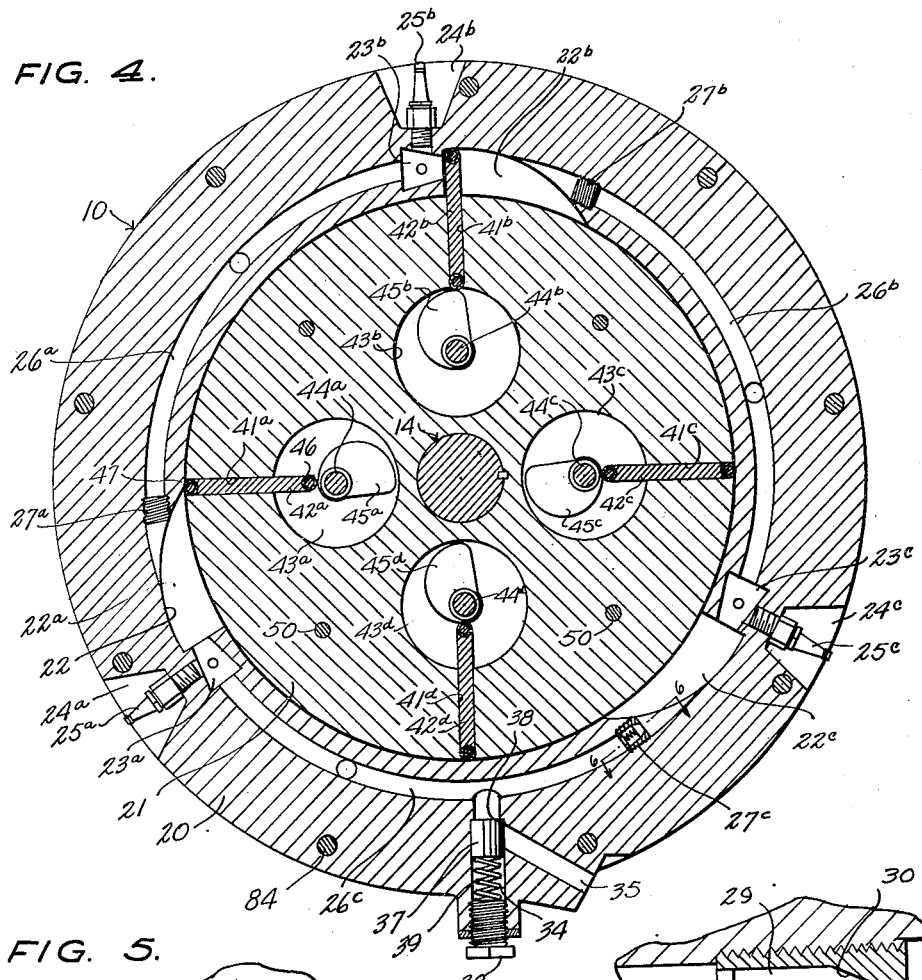
Figure 4 is a transverse cross sectional view on the line 4—4 of Figure 3.
Figure 5 is a fragmentary cross sectional view on the line 5—5 of Figure 3.
Figure 6 is a fragmentary cross sectional view on an enlarged scale on the line 6—6 of Figure 4.

The power unit 10 comprises an annular stator 20 having a generally cylindrical outer surface and having flat and substantially parallel side walls, and a two-part rotor 21 mounted on the power shaft 14 and disposed within the stator 20. The outer surface of the rotor is substantially cylindrical, as illustrated in Figure 4, and the inner surface of the stator 20 is also substantially cylindrical and fits closely around the peripheral surface of the rotor, sufficient clearance only being provided to permit free rotation of the rotor in the stator under conditions of varying temperatures and power operation.

In the arrangement illustrated the stator 20 is provided in its inner surface with three recesses 22 constituting tapered expansion chambers 22a, 22b and 22c.

Three expansion chambers, spaced apart at angular intervals of substantially 180 degrees, have been illustrated to disclose a relatively simple form of the invention. It is to be understood however, that different numbers of expansion chambers spaced apart at substantially equal angular intervals may be used without in any way exceeding the scope of the invention.

The side walls of the expansion chambers are flat and substantially parallel to each other, but the outer or bottom wall is arcuately curved and is inclined from a position at the front end of the expansion chamber intermediate the thickness of the stator 20 to the inner surface of the stator at the rear end of the expansion chamber.

Combustion chambers 23a, 23b and 23c are disposed at the front ends of the expansion chambers 22a, 22b and 22c respectively.

Each of the combustion chambers is of somewhat truncated conical shape and has its smaller end in communication with the front end of the corresponding expansion chamber.

Recesses 24a, 24b and 24c are provided in the outer surface of the stator in radial alignment with the corresponding combustion chambers and tapped holes lead from the bottoms of these recesses into the combustion chambers. Spark plugs 25a, 25b and 25c are disposed in the recesses and threaded into the tapped holes in position to ignite combustible charges in the combustion chambers.

An arcuately curved channel or gas passage 26a extends through the body of the stator 20 from the expansion chamber 22a intermediate the length thereof to the end of the combustion chamber 23b remote from the expansion chamber 22b. A channel or passage 26b similar to the channel or passage 26a leads from the expansion chamber 22b to the combustion chamber 23c and a channel or passage 26c leads from the expansion chamber 22c to the combustion chamber 23a.

A check valve 27c, illustrated in detail in Figure 6, is disposed in the channel 26c and is effective to preclude flow of gas in a direction from the combustion chamber 23a back to the expansion chamber 22c but permits the free flow of gas from the expansion chamber 22c to the combustion chamber 23a. Similar check valves operating in the same manner are provided in the passages 26a and 26b as indicated at 27a and 27b.

As illustrated in Figure 6, the check valve comprises an externally screw threaded cylinder 28 threaded into an internally screw threaded portion of the corresponding channel and having a cylindrical bore 29 therein, one end of which is constricted to provide a conical valve seat 30 converging toward the adjacent end of the cylinder. A valve piston 31 having a conical peripheral portion cooperating with the valve seat 30 is disposed in the cylinder and a compression spring 32 is disposed in the cylinder between the valve piston 31 and a spring abutment structure 33 secured in the other end of the cylinder 28.

An exhaust passage is provided in each stator. As particularly illustrated in Figures 3 and 4, an elongated cylindrical chamber 34 is provided in the stator 20 extending radially of the stator and leading from the outer surface thereof to the channel 26c. A branch passage 35 leads from the chamber 34 at a location adjacent the channel 26c through a boss formation on the stator to which an exhaust conduit 36 is connected, as illustrated in Figure 2.

A valve piston 37 is slidable in the chamber 34 and is stopped by an annular shoulder 38 in the chamber at a location in which it closes the adjacent end of the branch passage 35. A screw plug 38 is threaded into the internally screw threaded outer end of the chamber 34 and a compression spring 39 disposed in the chamber 34 between the screw plug 38 and valve piston 37 resiliently holds the piston in position closing the exhaust passage 35. When the gas pressure in the channel 26c exceeds a predetermined value, the piston 37 is moved to uncover the adjacent end of the exhaust passage 35 and permit the gas to escape until the pressure is reduced to the predetermined value determined by the strength of spring 39 and adjustment of screw plug 38.

The stator 40 of the power unit 11 is constructed in exactly the same manner as the stator 20 of the unit 10, and described above.

The rotor 21 of the power unit 10 is provided with four radially extending notches or recesses 41a, 41b, 41c, and 41d spaced apart at angular intervals of approximately 90 degrees and all opening to the periphery of the rotor. These recesses extend transversely of the rotor for the major portion of the thickness of the rotor and vanes 42a, 42b, 42c and 42d are slidably mounted one in each of the radially disposed recesses in the rotor for movement radially of the rotor into and out of the expansion chambers 22a, 22b and 22c as the rotor rotates in the stator 20.

Circular chambers 43a, 43b, 43c and 43d are provided in the rotor at the inner ends of the slideway recesses 41a, 41b, 41c and 41d respectively, and cam shafts 44a, 44b, 44c and 44d are journaled in the rotor and disposed coaxially of the corresponding circular chambers. Cams 45a, 45b, 45c and 45d are mounted on the shafts 44a, 44b, 44c and 44d respectively and are disposed within the corresponding circular chambers and contact the inner ends of the corresponding vanes. Each of the vanes is provided on its inner end with a cam following antifriction roller 46 and is provided on its outer end with an antifriction roller 47 contacting the inner surface of the stator 20 to provide friction-reducing contacts between the outer ends of the vanes and the inner surface of the stator.

An internal ring gear 48 is mounted on the side of the stator 20 adjacent the end section 12 and pinion gears 49a, 49b, 49c and 49d are mounted respectively on the ends of the corresponding cam shafts and mesh with the teeth of the ring gear 48 to rotate the cam shafts relative to the rotor as the rotor rotates in the stator 20.

Figure 3:
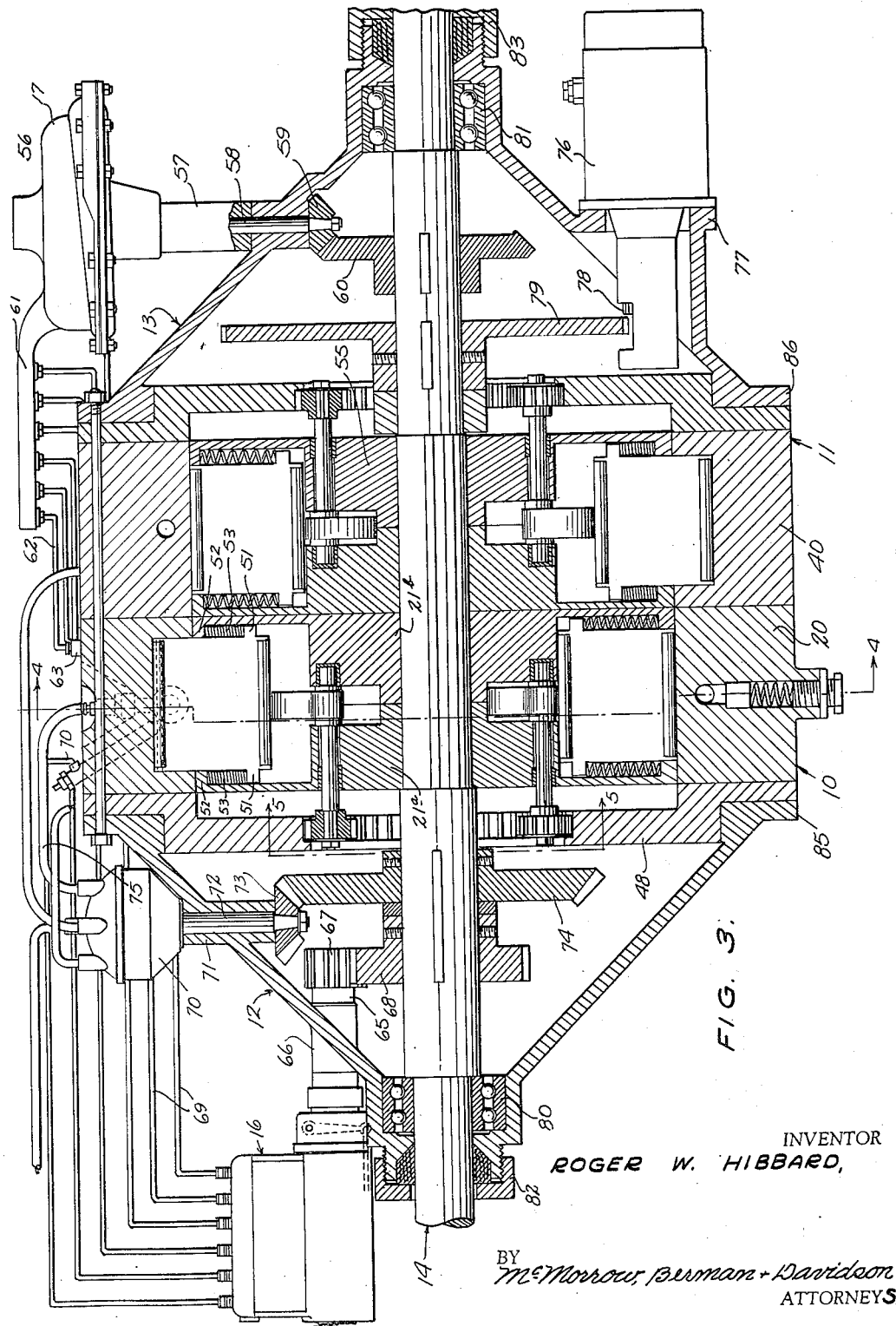
Figure 3 is a longitudinal cross sectional view on an enlarged scale on the line 3—3 of Figure 1.

The rotor is made in two separate parts 21a and 21b, as particularly illustrated in Figure 3, to facilitate the provision of the circular chambers therein and the mounting of the cams in the corresponding chambers. The two parts of the rotor may be firmly secured together by suitable means such as the through bolts or rivets 50 indicated in Figure 4.

Each of the vanes is provided with lugs 51 projecting outwardly from the opposite edges thereof and each vane receiving recess or slideway is provided at its outer end with formation 52 projecting inwardly from the edge portions of the recess and providing spring abutments at their inner sides, and compression springs 53 are disposed in each slideway between opposed lugs and spring abutment shoulders to resiliently urge the vanes inwardly of the corresponding slideways and into contact with the corresponding vane operating cams. These springs counteract to a predetermined extent the effect of centrifugal force which urges the vanes outwardly of the rotor as the rotor rotates.

The rotor 55 of the power unit 11 is similar in all respects to the rotor 21 of the power unit 10 described above and cooperates with its stator 40 in the same manner.

With the power unit construction above described, as the rotor rotates in the corresponding stator, when a vane is brought to the front end of an expansion chamber the corresponding cam forces the vane outwardly into contact with the outer or bottom wall of the expansion chamber. The associated spark plug then ignites the combustible charge in the adjacent combustion chamber and the resulting explosion drives the vane from the front to the rear end of the expansion chamber, imparting rotation to the rotor. When the vane passes the adjacent end of the associated gas channel, gas from the expansion chamber will flow through the associated check valve and through the channel into the successively disposed combustion chamber to compress a combustible charge in such successive combustion chamber.

The air compressor 17 comprises a compressor housing 56 containing an impeller, not illustrated, and mounted on a tubular base 57 secured to the engine end section 13. An impeller shaft 58 extends through the base 57 and carries a beveled pinion 59 on its end disposed within the end section 13. A beveled gear 60 is mounted on the shaft 14 and meshes with the pinion 59 to drive the impeller at a speed higher than the rotational speed of the shaft 14.

A manifold 61 is connected to the outlet of the supercharger housing 17 and branch ducts 62 lead from this manifold, one to each gas channel or passage 26 in each stator of the engine. Check valves 63 are disposed between the ducts 62 and the channels 26 to prevent air and exhaust gases from being forced back through the ducts toward the supercharger.

Before a vane reaches the front end of an expansion chamber the supercharger fills the expansion chamber, the associated combustion chamber and the channel connected to the combustion chamber with air at the supercharger pressure. Then, as the vane moves through the preceding expansion chamber and uncovers the corresponding end of the channel, this air is driven by the pressure in the combustion chamber through the channel into the succeeding combustion chamber and is compressed to an extent sufficient to provide efficient operation of the engine.

The fuel distributor 16 is of conventional construction and has an operating shaft 65 journaled in a sleeve 66 which extends through the engine end section 12. A spur gear 67 on shaft 66 within the end section 12 meshes with a spur gear 68 on the shaft 14 for driving the distributor of the fuel injection mechanism. Fuel lines 69 extend from the distributor 16 and lead to nozzles 70 mounted in the stator and so arranged that one nozzle projects into each combustion chamber 23. The timing of the fuel injection is such that fuel is injected into the combustion chambers after the combustion air has been compressed therein and substantially at the time a vane projects into the associated expansion chamber at the front end of the latter.

The electric ignition system is of the usual construction and includes a distributor 70 mounted on a sleeve 71 which extends through the wall of the engine end section 12. A distributor shaft 72 is journaled in the sleeve 71 and carries on its end within the engine end section a beveled pinion 73 which meshes with a beveled gear 74 on the shaft 14, to drive the distributor. Ignition wires 75 lead from the distributor 70 to the several spark plugs of the power units and the ignition timing is such that the corresponding spark plug ignites the fuel in each combustion chamber as the fuel is injected into the combustion chamber through the associated fuel injection nozzle.

An electric starter 76 of conventional construction is mounted on a boss 77 provided on the engine end section 13 and the starter gear 78 meshes with a gear 79 mounted on the shaft 14 during the starting of the engine.

The end sections 12 and 13 carry antifriction bearings 80 and 81 respectively in which the shaft 14 is journaled and packing glands 82 and 83 are provided one on each of these end sections to prevent the escape of lubricant from the interior of the engine around the power shaft.

In the operation of the engine, the products of combustion along with freshly admitted combustion air and fuel are driven circuitously about the engine stator from one combustion and expansion chamber unit to the next until the pressure of the gases in the stator reaches a predetermined value at which time the excess gas is released through the exhaust valve including the piston 37 and exhaust passage 35.

The stators and end sections of the engine are secured together by through bolts 84 extending through the stators and through annular flanges 85 and 86 on the end sections and the rotors are maintained in proper alignment with the associated stators by annular shoulders on the shaft 14 bearing against the inner sides of the antifriction bearings 80 and 81.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A rotary internal combustion engine comprising an annular stator having combustion chambers and tapered expansion chambers therein and having passages therein connecting each expansion chamber with an adjacent combustion chamber, a power shaft extending through said stator, end sections secured to said stator, bearings carried by said end sections rotatively supporting said shaft, a rotor mounted on said shaft and disposed within said stator, vanes carried by said rotor and movable into and out of said expansion chambers, electric ignition means connected with said combustion chambers, fuel injection means connected with said combustion chambers, engine driven supercharger means connected with said passages, check valves disposed one in each passage precluding flow of gas through each passage from the combustion chamber at one end to the expansion chamber at the other end of the passage while permitting flow of gas from the corresponding expansion chamber to the corresponding combustion chamber, and a relief valve connected with one of said passages for permitting the exhaust of gas above a predetermined pressure from said passages and combustion and expansion chambers.

2. A rotating internal combustion engine comprising a power section including at least one power unit, end sections disposed one at each end of said power unit and secured thereto, bearings carried by said end sections in alignment with each other, and a power shaft extending through said power section and journaled in said bearings, said power unit comprising an annular stator having a generally cylindrical surface and having expansion chambers therein spaced apart at substantially equal angular intervals and combustion chambers disposed one adjacent each of said expansion chambers and communicating therewith, said stator also having annularly arranged passages therein disposed between interconnected combustion and expansion chamber sets and extending from the expansion chamber of one set to the combustion chamber of the adjacent set in the direction of rotation of said power shaft, check valves disposed one in each passage precluding flow of gas from the corresponding combustion to the corresponding expansion chamber, a pressure operated exhaust valve communicating with at least one of said passages, a stator mounted on said power shaft and disposed within said stator, said rotor having a substantially cylindrical peripheral surface and having therein radially disposed recesses at least one more in number than the expansion chambers in said stator and spaced apart at substantially equal angular intervals with their outer ends opening to the peripheral surface of said rotor, vanes slidably disposed one in each of said recesses and movable from said rotor into and out of the expansion chambers in said stator, cam shafts journaled in said rotor one adjacent the inner end of each vane, cams provided one on each of said cam shafts and engaging the inner ends of said vanes to move the latter outwardly of said rotor, spring means acting between said vanes and said rotor urging said vanes inwardly of rotor gears provided one on each of said cam shafts, and a gear secured to said stator and meshing with the cam shaft gears to rotate said cam shafts as said rotor rotates in said stator.

3. A rotating internal combustion engine comprising a power section including at least one power unit, end sections disposed one at each end of said power unit and secured thereto, bearings carried by said end sections in alignment with each other, and a power shaft extending through said power section and journaled in said bearings, said power unit comprising an annular stator having a generally cylindrical surface and having expansion chambers therein spaced apart at substantially equal angular intervals and combustion chambers disposed one adjacent each of said expansion chambers and communicating therewith, said stator also having annularly arranged passages therein disposed between inter-connected combustion and expansion chamber sets and extending from the expansion chamber of one set to the combustion chamber of the adjacent set in the direction of rotation of said power shaft, check valves disposed one in each passage precluding flow of gas from the corresponding combustion to the corresponding expansion chamber, a pressure operated exhaust valve communicating with at least one of said passages, a stator mounted on said power shaft and disposed within said stator, said rotor having a substantially cylindrical peripheral surface and having therein radially disposed recesses at least one more in number than the expansion chambers in said stator and spaced apart at substantially equal angular intervals with their outer ends opening to the peripheral surface of said rotor, vanes slidably disposed one in each of said recesses and movable from said rotor into and out of the expansion chambers in said stator, cam shafts journaled in said rotor one adjacent the inner end of each vane, cams provided one on each of said cam shafts and engaging the inner ends of said vanes to move the latter outwardly of said rotor, spring means acting between said vanes and said rotor urging said vanes inwardly of said rotor, gears provided one on each of said cam shafts, a gear secured to said stator and meshing with the cam shaft gears to rotate said cam shafts as said rotor rotates in said stator, a supercharger driven by said power shaft and pneumatically connected to said passages supplying combustion air under pressure to said combustion and expansion chambers, and fuel injection means driven by said power shaft and connected to said combustion chamber injecting fuel into said combustion chambers at timed intervals.

4. A rotating internal combustion engine comprising a power section including at least one power unit, end sections disposed one at each end of said power unit and secured thereto, bearings carried by said end sections in alignment with each other, and a power shaft extending through said power section and journaled in said bearings, said power unit comprising an annular stator having a generally cylindrical surface and having expansion chambers therein spaced apart at substantially equal angular intervals and combustion chambers disposed one adjacent each of said expansion chambers and communicating therewith, said stator also having annularly arranged passages therein disposed between inter-connected combustion and expansion chamber sets and extending from the expansion chamber of one set to the combustion chamber of the adjacent set in the direction of rotation of said power shaft, check valves disposed one in each passage precluding flow of gas from the corresponding combustion to the corresponding expansion chamber, a pressure operated exhaust valve communicating with at least one of said passages, a stator mounted on said power shaft and disposed within said stator, said rotor having a substantially cylindrical peripheral surface and having therein radially disposed recesses at least one more in number than the expansion chambers in said stator and spaced apart at substantially equal angular intervals with their outer ends opening to the peripheral surface of said rotor, vanes slidably disposed one in each of said recesses and movable from said rotor into and out of the expansion chambers in said stator, cam shafts journaled in said rotor one adjacent the inner end of each vane, cams provided one on each of said cam shafts and engaging the inner ends of said vanes to move the latter outwardly of said rotor, spring means acting between said vanes and said rotor urging said vanes inwardly of said rotor gears provided one on each of said cam shafts, a gear secured to said stator and meshing with the cam shaft gears to rotate said cam shafts as said rotor rotates in said stator, a supercharger driven by said power shaft and pneumatically connected to said passages supplying combustion air under pressure to said combustion and expansion chambers, fuel injection means driven by said power shaft and connected to said combustion chamber injecting fuel into said combustion chambers at timed intervals, and electric ignition means driven by said power shaft and connected to said combustion chambers igniting fuel in the latter at timed intervals.

5. A rotating internal combustion engine comprising a power section including at least one power unit, end sections disposed one at each end of said power unit and secured thereto, bearings carried by said end sections in alignment with each other, and a power shaft extending through said power section and journaled in said bearings, said power unit comprising an annular stator having a generally cylindrical surface and having expansion chambers therein spaced apart at substantially equal angular intervals and combustion chambers disposed one adjacent each of said expansion chambers and communicating therewith, said stator also having annularly arranged passages therein disposed between inter-connected combustion and expansion chamber sets and extending from the expansion chamber of one set to the combustion chamber of the adjacent set in the direction of rotation of said power shaft, check valves disposed one in each passage precluding flow of gas from the corresponding combustion to the corresponding expansion chamber, a pressure operated exhaust valve communicating with at least one of said passages, a stator mounted on said power shaft and disposed within said stator, said rotor having a substantially cylindrical peripheral surface and having therein radially disposed recesses at least one more in number than the expansion chambers in said stator and spaced apart at substantially equal angular intervals with their outer ends opening to the peripheral surface of said rotor, vanes slidably disposed one in each of said recesses and movable from said rotor into and out of the expansion chambers in said stator, cam shafts journaled in said rotor one adjacent the inner end of each vane, cams provided one on each of said cam shafts and engaging the inner ends of said vanes to move the latter outwardly of said rotor, spring means acting between said vanes and said rotor urging said vanes inwardly of said rotor gears provided one on each of said cam shafts, and a gear secured to said stator and meshing with the cam shaft gears to rotate said cam shafts as said rotor rotates in said stator, each of said expansion chambers having a front end surface disposed radially of said stator, substantially parallel side surfaces and an outer surface arcuately inclined radially inwardly of said stator from the outer edge of the front end surface to the inner surface of said stator at the rear end of the expansion chamber, and each of said combustion chambers being of truncated conical shape and opening only to the associated expansion chamber at the front end of the latter.

ROGER W. HIBBARD.

REFERENCES CITED

The following references are of record in the file of this patent:

UNITED STATES PATENTS

| Number | Name | Date |
|---|---|---|
| 1,207,666 | Tompkins | Dec. 5, 1916 |
| 1,303,134 | Vawter | May 6, 1919 |
| 1,350,231 | McFarland | Aug. 17, 1920 |
| 1,808,084 | Tidd | June 2, 1931 |
| 2,170,414 | Jutting | Aug. 22, 1939 |